United States Patent
Korah et al.

(10) Patent No.: US 8,620,089 B1
(45) Date of Patent: Dec. 31, 2013

(54) STRIP HISTOGRAM GRID FOR EFFICIENT SEGMENTATION OF 3D POINT CLOUDS FROM URBAN ENVIRONMENTS

(75) Inventors: Thommen Korah, Marina Del Rey, CA (US); Swarup S. Medasani, Thousand Oaks, CA (US); Yuri Owechko, Newbury Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 568 days.

(21) Appl. No.: 12/644,349

(22) Filed: Dec. 22, 2009

(51) Int. Cl.
*G06K 9/46* (2006.01)

(52) U.S. Cl.
USPC ........... 382/195; 382/173; 382/154; 382/159; 345/419; 345/630

(58) Field of Classification Search
USPC ................. 382/173, 154, 159, 195, 168–172; 345/419, 630
See application file for complete search history.

(56) References Cited

U.S. PATENT DOCUMENTS

| | | |
|---|---|---|
| 2007/0201743 A1 | 8/2007 | Ferman |
| 2008/0018941 A1 | 1/2008 | Taylor |
| 2009/0190827 A1 | 7/2009 | Saito |

OTHER PUBLICATIONS

Himmelsbach et al: "Real-time Object Classification in 3D Point Clouds Using Point Feature Histograms", International Conference on Intelligent Robots and Systems, IEEE, Oct. 11-15, 2009.*
Anguelov et al: "Discriminative Learning of Markov Random Fields for Segmentation of 3D Scan Data", IEEE, 2005.*
U.S. Appl. No. 12/644,751, filed Dec. 22, 2009, Korah.

* cited by examiner

*Primary Examiner* — Ruiping Li
(74) *Attorney, Agent, or Firm* — Ladas & Parry

(57) ABSTRACT

A method of recognizing features in a 3D environment includes using a sensor that collects a plurality of sensed data points, populating a strip histogram grid having a plurality of strips, each strip having a dx dimension and a dy dimension, by assigning each sensed data point to a strip in the strip histogram grid that has x, y and z dimensions that encompass the spatial coordinate information of the respective assigned sensed data point, and estimating the local ground plane for a strip in the strip histogram grid by using information on each sensed data point assigned to that strip and surrounding strips in the strip histogram grid. Further methods include extracting smooth surfaces, building segmentation, top down segmentation and bottom up segmentation.

31 Claims, 13 Drawing Sheets

SENSING THE 3D ENVIRONMENT USING A SENSOR THAT
COLLECTS A PLURALITY OF SENSED DATA POINTS FROM 200
THE 3D ENVIRONMENT, EACH SENSED DATA POINT
HAVING SPATIAL COORDINATE INFORMATION IN THREE
DIMENSIONS X, Y AND Z

POPULATING A STRIP HISTOGRAM GRID HAVING A 202
PLURALITY OF STRIPS, EACH STRIP HAVING A DX
DIMENSION AND A DY DIMENSION, WHEREIN DX IS A
PORTION OF AN X DIMENSION OF THE STRIP HISTOGRAM
GRID AND DY IS A PORTION OF A Y DIMENSION OF THE
STRIP HISTOGRAM GRID, BY ASSIGNING EACH SENSED
DATA POINT TO A STRIP IN THE STRIP HISTOGRAM
GRID THAT HAS X, Y AND Z DIMENSIONS THAT
ENCOMPASS THE SPATIAL COORDINATE INFORMATION OF
THE RESPECTIVE ASSIGNED SENSED DATA POINT

ESTIMATING THE LOCAL GROUND PLANE FOR A STRIP IN 204
THE STRIP HISTOGRAM GRID BY USING INFORMATION ON
EACH SENSED DATA POINT ASSIGNED TO THAT STRIP
AND SURROUNDING STRIPS IN THE STRIP HISTOGRAM
GRID

FIG. 5A

| DIVIDING EACH STRIP INTO A PLURALITY OF CELLS, EACH CELL HAVING A DIMENSION OF DX, DY, AND DZ | 206 |

| INITIALIZING A GROUND SUPPORT VARIABLE FOR EACH CELL OF THE PLURALITY OF CELLS TO ZERO | 208 |

| INCREMENTING A GROUND SUPPORT VARIABLE ASSOCIATED WITH A RESPECTIVE CELL BY 1 EACH TIME A SENSED DATA POINT IS ASSIGNED TO THAT RESPECTIVE CELL OR A SENSED DATA POINT IS ASSIGNED TO A CELL IN A SURROUNDING STRIP HAVING A SAME Z DIMENSION AS THE RESPECTIVE CELL AND BEING WITHIN A SET DISTANCE OF THE RESPECTIVE CELL | 210 |

| ESTIMATING THE LOCAL GROUND PLANE FOR THE RESPECTIVE STRIP AS BEING THE LOWEST Z LEVEL CORRESPONDING TO A CELL WITHIN THE RESPECTIVE STRIP WITH A RESPECTIVE GROUND SUPPORT VARIABLE GREATER THAN A THRESHOLD | 212 |

FIG. 5B

COMPUTING PARTIAL DERIVATIVES OF STRIP HEIGHT $S^H$, WHEREIN STRIP HEIGHT IS A MAXIMUM Z DIMENSION $S^{MAX}$ FOR AN ASSIGNED SENSED DATA POINT IN A RESPECTIVE STRIP, ALONG X AND Y AXES FOR STRIPS IN A 3 X 3 STRIP NEIGHBORHOOD OF THE RESPECTIVE STRIP — 220

ESTIMATING A LOCAL HEIGHT GRADIENT $S^{ZSLOPE}$ FOR THE RESPECTIVE STRIP FROM THE PARTIAL DERIVATIVES — 222

LABELING THE RESPECTIVE STRIP AS SMOOTH $S^{SM}$ = TRUE IF A RANGE IN LOCAL HEIGHT GRADIENT $S^{ZSLOPE}$ FOR THE STRIPS WITHIN THE 3 X 3 STRIP NEIGHBORHOOD OF THE RESPECTIVE STRIP IS LESS THAN A THRESHOLD $T_z$ — 224

FIG. 6A

USING A PREDICATE $P_{SM}$ TO EXTRACT OUT SMOOTH SURFACES WHEREIN THE PREDICATE COMPRISES SATISFYING A FIRST CONDITION OR A SECOND CONDITION — 226

WHEREIN THE FIRST CONDITION IS TRUE IF TWO NEIGHBORING STRIPS ARE LABELED AS $S^{SM}$ = TRUE AND A DIFFERENCE IN A HEIGHT OF EACH OF THE NEIGHBORING STRIPS IS LESS THAN A FIRST THRESHOLD $T_{Z1}$

228

WHEREIN THE SECOND CONDITION IS TRUE IF ONE OF THE TWO NEIGHBORING STRIPS ARE LABELED AS $S^{SM}$ = TRUE AND A DIFFERENCE IN A LOCAL HEIGHT GRADIENT $S^{ZSLOPE}$ OF THE NEIGHBORING STRIPS IS LESS THAN A SECOND THRESHOLD $T_{Z2}$ — 230

FIG. 6B

CALCULATING AN IMAGE $G_M$ OF DIMENSIONS $N_X \times N_Y$, WHEREIN THE IMAGE CONTAINS A MINIMUM HEIGHT $S^{ZMIN}$ FROM THE LOCAL GROUND PLANE OF ALL SENSED DATA POINTS IN A RESPECTIVE STRIP — 240

FORMING AN IMAGE COMPRISING STRIP HEIGHT $S^H$ FOR EACH RESPECTIVE STRIP LABELED AS $S^{SM}$ = TRUE — 242

FORMING A PROVISIONAL MAP $B_{PM} = MAX(G_M, S_M)$ BY COMPARING $S^{ZMIN}$ FROM $G_M$ AND $S^H$ FROM $S_M$ AND SETTING $S^{BM}$ OF EACH RESPECTIVE STRIP IN THE PROVISIONAL MAP TO THE MAXIMUM OF $S^{ZMIN}$ AND $S^H$ — 244

FIG. 7A

USING A PREDICATE $P_{BLD}$ TO PERFORM BUILDING SEGMENTATION WHEREIN THE PREDICATE COMPRISES SATISFYING A FIRST BUILDING SEGMENTATION CONDITION OR A SECOND BUILDING SEGMENTATION CONDITION  246

WHEREIN THE FIRST BUILDING SEGMENTATION CONDITION IS TRUE IF TWO NEIGHBORING STRIPS ARE LABELED AS $S^{SM}$ = TRUE AND A RATIO OF $S^H$ HEIGHTS BETWEEN THE NEIGHBORING STRIPS IS LESS THAN OR EQUAL TO A FIRST THRESHOLD $T_{R1}$  248

WHEREIN THE SECOND BUILDING SEGMENTATION CONDITION IS TRUE IF AN ABSOLUTE DIFFERENCE IN $S^{BM}$ IS LESS THAN A SECOND THRESHOLD $T_{R2}$ AND THE RATIO OF HEIGHTS BETWEEN THE NEIGHBORING STRIPS IS LESS THAN OR EQUAL TO A THIRD THRESHOLD $T_{R3}$  250

FIG. 7B

USING A PREDICATE $P_{TD}$ TO PERFORM TOP DOWN
SEGMENTATION WHEREIN THE PREDICATE COMPRISES     260
SATISFYING A FIRST TOP DOWN SEGMENTATION
CONDITION, A SECOND TOP DOWN SEGMENTATION
CONDITION, AND A THIRD TOP DOWN SEGMENTATION
CONDITION

WHEREIN THE FIRST TOP DOWN CONDITION IS TRUE IF   262
PBLD ($S_I$, $S_J$) IS NOT TRUE

WHEREIN THE SECOND TOP DOWN CONDITION IS TRUE IF
EACH OF TWO NEIGHBORING STRIPS HAVE A BOOLEAN     264
FLAG $S^{POP}$ SET TO TRUE DESIGNATING THAT THE
RESPECTIVE STRIP IS POPULATED ABOVE THE LOCAL
GROUND PLANE FOR THE RESPECTIVE STRIP

WHEREIN THE THIRD TOP DOWN SEGMENTATION
CONDITION IS TRUE IF THE RATIO OF HEIGHTS
BETWEEN THE NEIGHBORING STRIPS IS LESS THAN OR    266
EQUAL TO A THRESHOLD $T_{TD1}$

FIG. 8

USING A PREDICATE $P_{BUP}$ TO PERFORM BOTTOM UP SEGMENTATION WHEREIN THE PREDICATE COMPRISES SATISFYING A FIRST TOP DOWN SEGMENTATION CONDITION, A SECOND TOP DOWN SEGMENTATION CONDITION, AND A THIRD TOP DOWN SEGMENTATION CONDITION   270

WHEREIN THE FIRST BOTTOM UP CONDITION IS TRUE IF PBLD ($S_I$, $S_J$) IS NOT TRUE   272

WHEREIN THE SECOND BOTTOM UP CONDITION IS TRUE IF EACH OF TWO NEIGHBORING STRIPS HAVE A BOOLEAN FLAG $S^{POP}$ SET TO TRUE DESIGNATING THAT THE RESPECTIVE STRIP IS POPULATED ABOVE THE LOCAL GROUND PLANE FOR THE RESPECTIVE STRIP   274

WHEREIN THE THIRD BOTTOM UP SEGMENTATION CONDITION IS TRUE IF THE RATIO OF BOTTOM UP HEIGHTS BETWEEN THE NEIGHBORING STRIPS IS LESS THAN A THRESHOLD $T_{BUP1}$   276

FIG. 9

STRIP HISTOGRAM GRID FOR EFFICIENT SEGMENTATION OF 3D POINT CLOUDS FROM URBAN ENVIRONMENTS

STATEMENT REGARDING FEDERALLY SPONSORED RESEARCH OR DEVELOPMENT

This invention was made with Government support under contract number HM1582-07-C-0017, entitled, "Urban Reasoning and Geospatial Exploitation Technology (URGENT)," awarded by DARPA. The Government has certain rights in this invention.

FIELD

This disclosure relates to 3D recognition systems for sensor collected data, and more particularly to 3D recognition systems for 3D point cloud data generated by LIDAR, time-of-flight imagers, laser scanners, stereo imagers, or other sensors for sensing and automated understanding of 3D environments.

BACKGROUND

The data collected by LIDAR, time-of-flight imagers, laser scanners, stereo imagers, or other related sensors contains millions of data points that store the spatial coordinates of the each data point along with any other information, such as RGB color information. Advances in sensor technology have enabled such colorized point cloud data to be routinely collected for large urban scenes using both ground-based and airborne LIDAR sensor platforms.

LIDAR (Light Detection and Ranging) is an optical remote sensing technology that measures properties of scattered light to find range and/or other information of a distant target. The prevalent method to determine distance to an object or surface is to use laser pulses. The result of scanning an urban scene, for example, with a LIDAR is millions of data points $p_n$ each having x, y and z spatial coordinates $p_n=(x,y,z)$.

Once the millions of points have been collected the problem is to recognize meaningful objects from the millions of points from objects such as buildings, trees, and streets. Humans do not see millions of points, but instead seemingly effortlessly break the scene down into buildings, trees, cars, etc. Humans are further assisted by prior knowledge of the world, which enables sifting through the seemingly infinite number of possibilities to determine a few plausible ones. For example, humans know that objects such as buildings rest on the ground, and so human use this information to determine the ground plane in the vicinity of the objects.

Estimating where the ground plane is from the millions of collected points collected by a sensor is a challenge. However, if this can be done with reasonable accuracy then the groundwork is laid to recognize other meaningful objects in the millions of collected points.

Some prior art techniques to recognize objects, as well as the ground plane, rely on strict assumptions on the serial ordering of the collected 3D scan lines. One approach is to try to reconstruct surface meshes by triangulation of the points, which can be slow, sensitive to noise, and makes assumptions about sampling density. The prior art also attempts to directly process the individually collected data points, which introduces scalability issues.

Another approach in the prior art is to build intermediate representations that reduce resolution and may be sensitive to quantization. Yet another approach that has been tried is to use level sets and other continuous approximations like B-splines, which have lower memory requirements, but cannot easily handle sharp edges or peaks in the data.

Yet another approach using mesh-based representations requires non-trivial processing to construct and cannot be updated with new incoming data. Other implicit geometry representations such as voxels allow efficient processing, but may be sensitive to missing information and empty cells since they only store local statistics.

All of these approaches attempt to find objects such as buildings, trees, cars and streets, and also attempt to find other more obscure objects such as poles, powerlines and posts. These approaches also attempt to estimate the ground plane. However, all of these prior art approaches have disadvantages and are not robust.

What is needed is a method for estimating the ground plane and recognizing objects such as buildings, trees, cars and streets from millions of collected 3D data points. Also needed is a method to find other objects such as poles, powerlines and posts. The embodiments of the present disclosure answer these and other needs.

SUMMARY

In a first embodiment disclosed herein, a method of recognizing features from sensed data points collected in a 3D environment comprises sensing the 3D environment using a sensor that collects a plurality of sensed data points from the 3D environment, each sensed data point having spatial coordinate information in three dimensions x, y and z; populating a strip histogram grid having a plurality of strips, each strip having a dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point; and estimating the local ground plane for a strip in the strip histogram grid by using information on each sensed data point assigned to that strip and surrounding strips in the strip histogram grid.

In another embodiment disclosed herein, a method of recognizing features from sensed data points collected in a 3D environment comprises sensing the 3D environment using a sensor that collects a plurality of sensed data points from the 3D environment, each sensed data point having spatial coordinate information in three dimensions x, y and z, populating a strip histogram grid having a plurality of strips, each strip having a z, a dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point, dividing each strip into a plurality of cells, each cell having a dimension of dx, dy, and dz, and estimating the local ground plane for a respective strip as being the lowest z level corresponding to a cell within the respective strip by using information on each sensed data point assigned to that strip and surrounding strips in the strip histogram grid.

In another embodiment disclosed herein, a method of recognizing features from sensed data points collected in a 3D environment comprises sensing the 3D environment using a sensor that collects a plurality of sensed data points from the 3D environment, each sensed data point having spatial coordinate information in three dimensions x, y and z, populating a strip histogram grid having a plurality of strips, each strip having a z, a dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point, estimating the local ground plane for a respective strip in the strip histogram grid by using information on each sensed data point assigned to the respective strip and surrounding strips in the strip histogram grid, estimating a plurality of features for each respective strip in the strip histogram grid, and performing segmentation of the strip histogram grid using the local ground plane estimate for each respective strip and the plurality of features for the strips in the strip histogram grid.

In further aspects disclosed herein, the method comprises extracting smooth surfaces, building segmentation, top down segmentation, and bottom up segmentation.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 5A and 5B show flow diagrams for a method of determining a local ground plane in accordance with the present disclosure;

FIGS. 6A and 6B show flow diagrams for a method of determining smooth surfaces in accordance with the present disclosure;

FIGS. 7A and 7B show flow diagrams for a method of building segmentation in accordance with the present disclosure;

FIG. 8 shows a flow diagram for a method of top down segmentation in accordance with the present disclosure; and FIG. 9 shows a flow diagram for a method of bottom up segmentation in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1A:
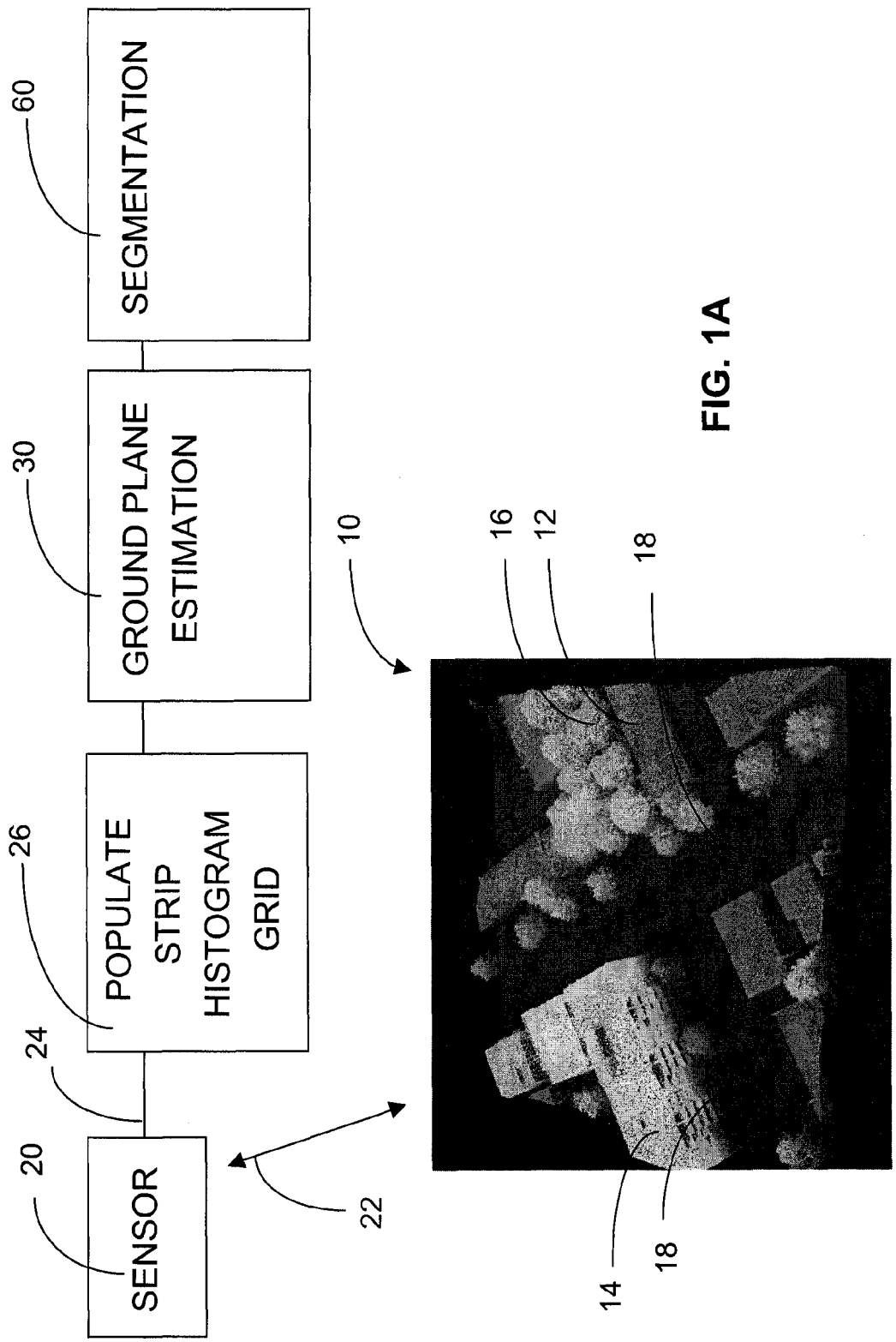
FIGS. 1A and 1B show block diagrams of a system for ground plane estimation and segmentation for sensor collected 3D point clouds in accordance with the present disclosure.

Referring to FIG. 1A, a block diagram is shown of a system for ground plane estimation and segmentation for sensor collected 3D point clouds in accordance with the present disclosure. A typical urban scene 10 is shown, which includes buildings 12 and 14, trees 16 and street 18, among other features. A sensor 20, which may be a LIDAR or other sensor, senses each sensed data point in the scene 10 via signals 22 and delivers a 3D point cloud of data 24 to a process 26 for populating a strip histogram grid (SHG).

All the methods disclosed in the present disclosure are performed on computer hardware that includes processor hardware and computer readable memory. The sensor data points collected by the sensor 20 are written onto the computer readable memory, which is fully accessible by the processor hardware. The computer hardware may be a desktop computer.

Figure 2:
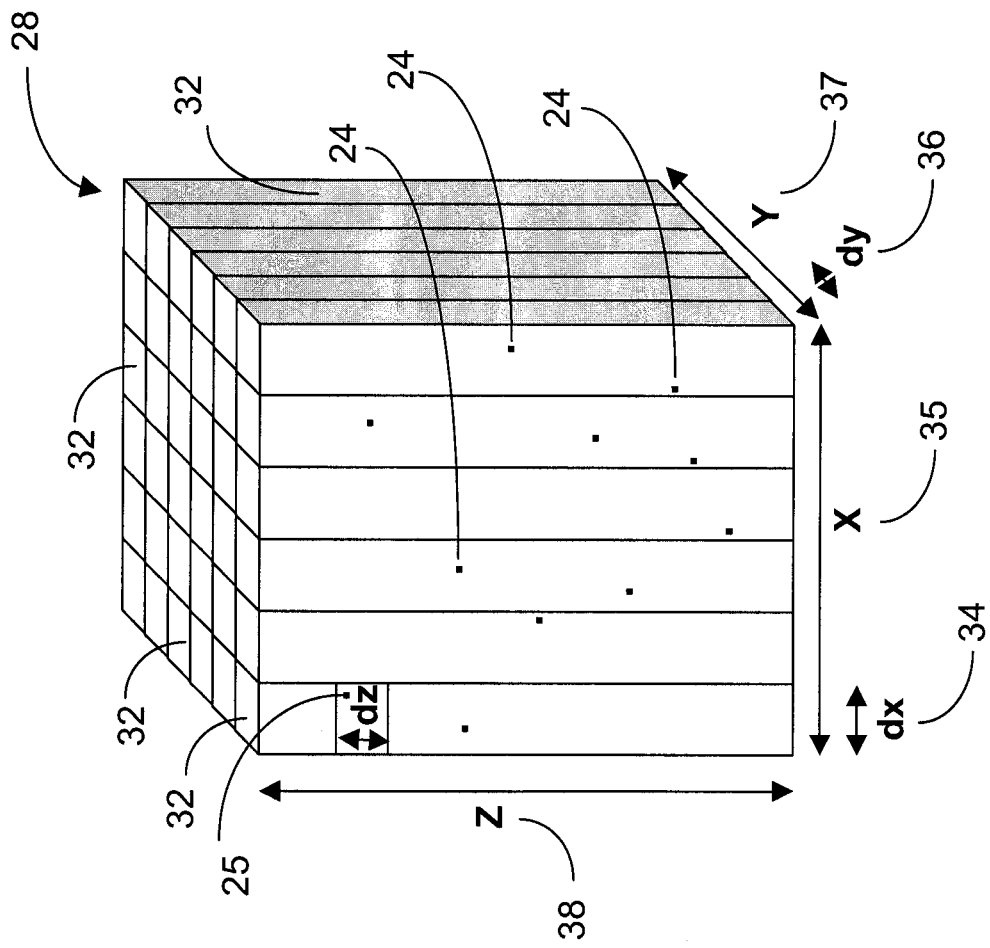
FIG. 2 shows a perspective view of a strip histogram grid in accordance with the present disclosure.

FIG. 2 shows a populated SHG 28. Each sensed data point from the 3D environment p(x,y,z) 24 has spatial coordinate information in three dimensions x, y and z, which may be in UTM coordinates. The SHG 28 includes a plurality of strips 32 and may have x 35, y 37, and z 38 extents at least as large as a maximum extent of the spatial coordinate information of the sensed data points p(x,y,z). The dimension of each strip 32 may have a dx 34 dimension equal to a dy 36 dimension, wherein dx 34 is a portion of the X 35 dimension and dy 36 is a portion of the Y 37 dimension. The SHG 28 is populated by assigning each sensed data point p(x,y,z) 24 to a strip 32 in the strip histogram grid 28 that has x, y and z dimensions that encompass the spatial coordinate information of the assigned sensed data point.

Figure 3:
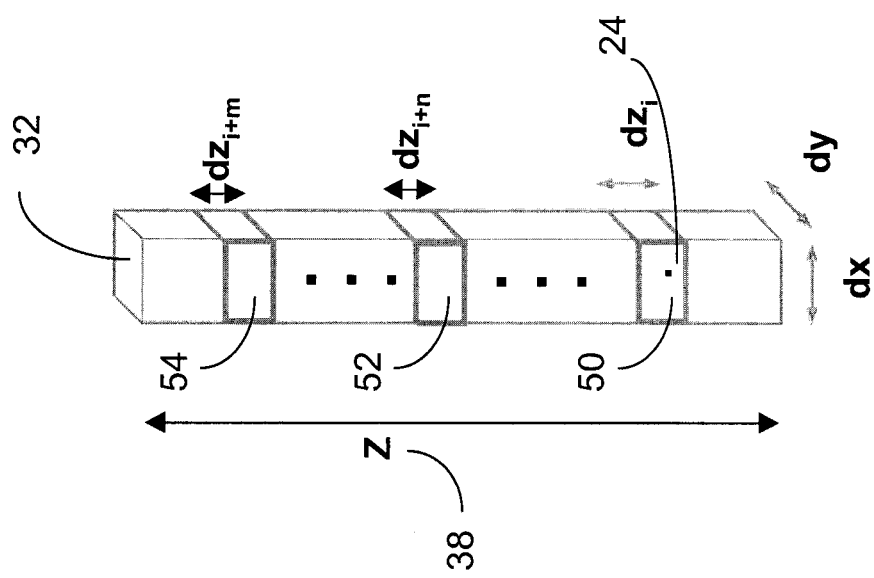
FIG. 3 shows a perspective view of one strip of a strip histogram grid in accordance with the present disclosure.

FIG. 3 shows a perspective view of one strip 32 of a strip histogram grid in accordance with the present disclosure. The strip 32 is further divided into cells 50, 52, 54, and so on that each have a dx, dy and dz size. In one embodiment the cells may have a dimension of dx=dy=dz=32 cm. Each p(x,y,z) 24 is further assigned to a cell in a strip 32. For example, sensed data point 25 in FIG. 2 is assigned to a cell with dimension dx, dy, dz at an appropriate location in the strip grid.

When dealing with outdoor 3D sensor data, arguably the most important cue is a reliable estimate of the ground plane. A single global ground plane may be computed by histogramming the z-values of all points and estimating the lowest level with enough supporting points, which would suffice if the terrain is mostly flat. However, often 3D sensor data spans a large area with several topographical variations like undulating hills, steep cliffs, water-bodies, etc.

According to the present disclosure, each strip 32 obtains an estimate of the local ground plane using information of sensor data points within the strip 32 as well as information of sensor data points in strips surrounding the strip. This is to increase robustness to any outlier sensor data points, for example, points below the actual ground and stray disconnected points that do not belong to a real-world object, which are common problems when data is collected using a sensor 20. Diffusely reflecting target objects like bushes and trees can also introduce erroneous points in LIDAR and other sensor data collected outdoors.

Figure 4:
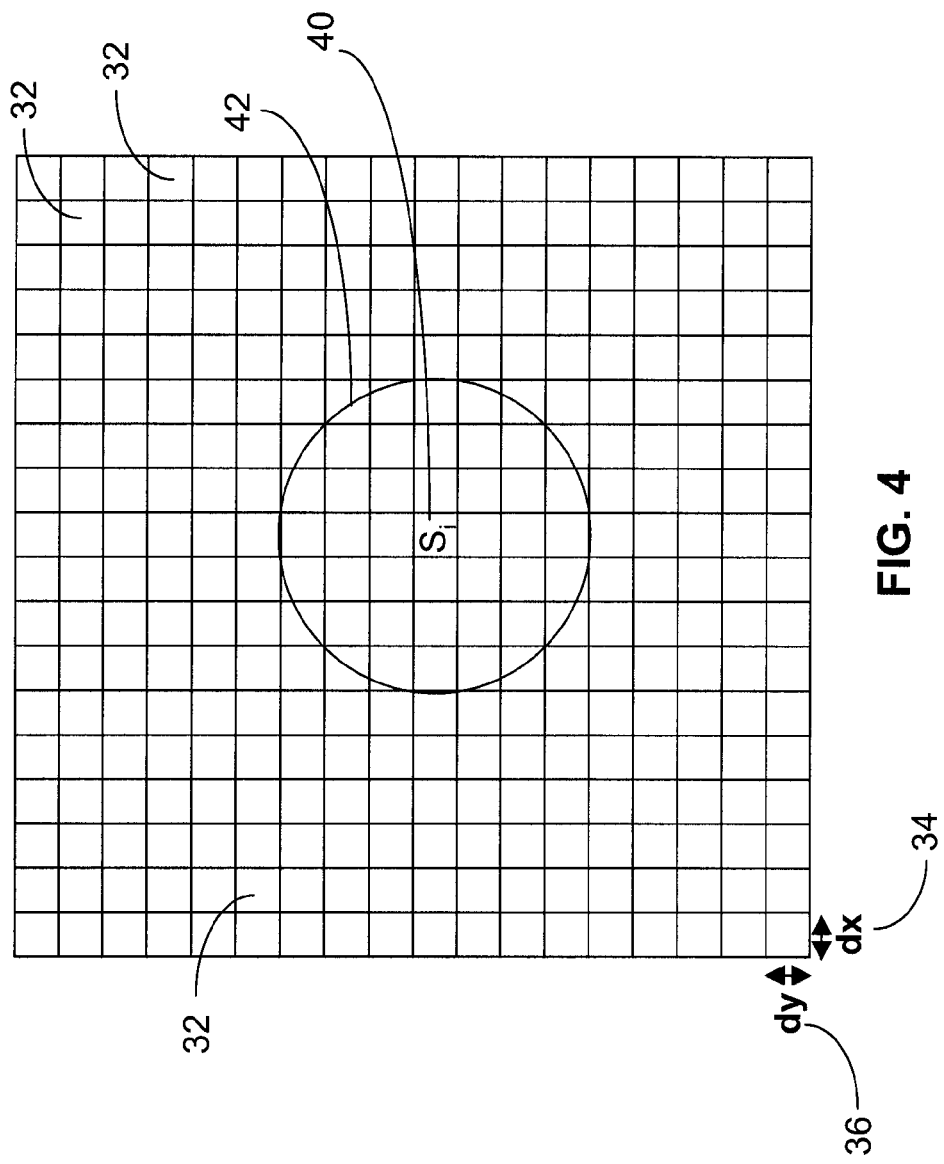
FIG. 4 shows a top view of a strip histogram grid in accordance with the present disclosure.

Ground plane estimation 30 starts by associating with every cell k, such as cell 50 in strip $S_i$ 32 (with dimensions dx, dy, and dz) a ground support variable $G_i(k)$ that is first initialized to 0. Whenever a point is added to strip cell $S_i(k)$, which may be cell 50 for example, it increments $G_j(k)$ of all strips j that fall within the neighborhood of $S_i$ with a corresponding cell k, which defines cells at the same coordinate z. This neighborhood is defined as a circular region 42, which may have a 1 meter radius centered on $S_i$ 40, as shown in FIG. 4, or from a 3×3 set of strips surrounding the strip $S_i$ 40.

Once all the input sensor data points have been added to populate a strip histogram grid (SHG), strip properties may be computed based on the accumulated evidence. The local ground plane $S_i$gnd for strip i is estimated as the lowest z-level cell with $G_i(k)$ greater than threshold $t_{gnd}$. A reasonable value for $t_{gnd}$ is 100, but can be changed depending on sensor resolution. The method for determining the local ground plane is further described in steps 200 to 212 in the flow diagrams of FIGS. 5A and 5B.

Other features stored for each strip 32 may include strip height $S_i^H$=maximum z for p(x,y,z) within the strip minus gnd the local ground plane $S_i^{gnd}$ for the strip, extent of z-value within the strip $S_i^{zmin}$=min z for sensed data points in the strip and $S_i^{zmax}$=max z for sensed data points in the strip, boolean flag $S_i^{POP}$ denoting whether a strip is populated above gnd the local ground plane $S_i^{gnd}$ for the strip, number of points above the local ground plane $S_i^{pts}$, number of continuously populated cells above local ground plane $S_i^C$, and the local terrain slope $S_i^{zslope}$ computed on a 3×3 strip neighborhood.

Segmentation 60, as shown in FIG. 1A, involves grouping neighboring strips that have similar attributes and proceeds in stages. Global information gleaned from previous stages may bring in additional context. In the present disclosure, a graph-based approach to segmentation is used that partitions strips 32 into regions such that each region ideally corresponds to a 3D object in the world. Each strip 32 has edges to its 8-connected neighbor strips. Edge weights between strips should be lower if they belong to the same object, and higher if the strips belong to different objects. The edge weights are derived from a set of predicate P functions that measure the compatibility between two neighboring strips $S_i$ and $S_j$.

Initialization for an input point cloud consists of populating the strip histogram grid 28 and computing the attributes, such as the local ground plane estimate 30 for a strip 32, as described above. Then a grouping engine performs segmentation in multiple phases. Each pass calls Algorithm 1, shown below, and involves a graph traversal to separate out coherent regions, which takes only a few milliseconds on a regular desktop.

Figure 1B:
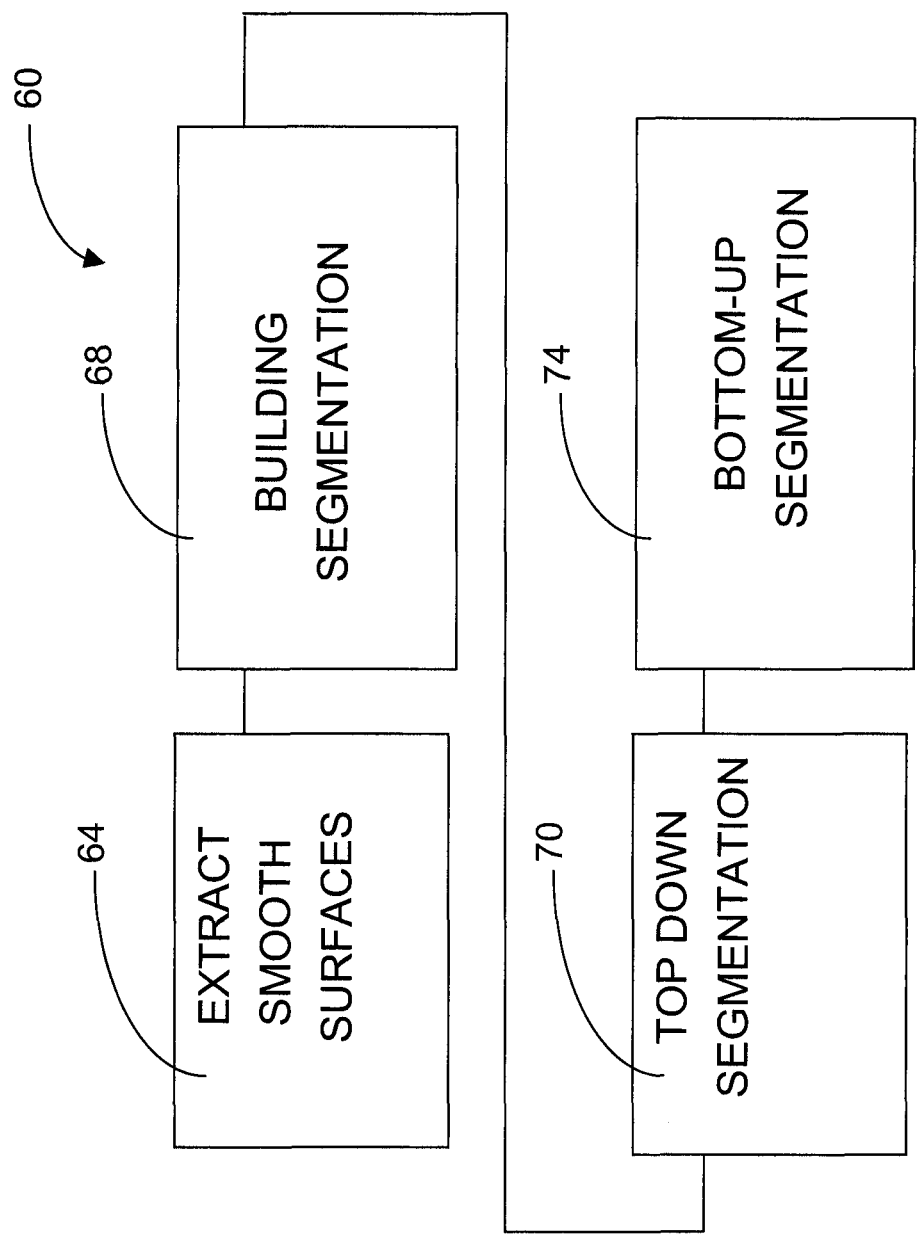

The first phase 64 of segmentation 60, as shown on FIG. 1B, extracts smooth surfaces—often a good indication of man-made structures in urban environments. The second phase 68 of segmentation 60 grows the smooth regions outward to precisely segment out building areas. The third phase 70 of segmentation 60 is a top-down segmentation that exploits height constraints to identify boundaries between objects. Since the latter may miss shorter objects that fall under larger structures like trees, a fourth bottom-up segmentation phase 74 attempts to identify objects that project out from the ground plane. While most regions are then passed to a classifier for object recognition, some objects that rely on larger context are more easily identified within the described framework itself.

The grouping engine makes use of binary predicate functions due to their simplicity and efficiency. A breadth-first graph traversal extracts out connected components. Though greedy, the results demonstrate that these compatibility constraints are able to produce very natural segment boundaries. The pseudo-code for the grouping engine is illustrated in Algorithms 1 and 2, shown below.

Each phase uses the above framework while defining the two functions V(s) and P(u,v) that are tailored for different goals. V(s) determines whether grouping for a particular component may start at strip S, then all reachable strips from strip S (based on compatibility predicate P) are extracted and labeled by LABELREACHABLESTRIPS. The following describes each phase of the grouping process.

| Segmentation Framework |
| --- |
| Algorithm 1 SEGMENTSTRIPS(S) |
| curlabel ← 0<br>for each strip s ∈ S do<br>   $s^{label}$ ← NIL<br>end for<br>for each strip s ∈ S do<br>   if V(s) = true and $s^{label}$ = NIL then |

| Segmentation Framework |
| --- |
| LABELREACHABLESTRIPS(s, curlabel)<br>   end if<br>   curlabel ← curlabel + 1<br>end for |
| Algorithm 2 LABELREACHABLESTRIPS(s, id) |
| visited[0..N − 1] = false<br>Q ← ∅<br>ENQUEUE (Q, s)<br>visited[s] = true<br>while Q ≠ ∅ do<br>   u ← DEQUEUE(Q)<br>   $u^{label}$ ← id<br>   for each strip v ∈ NBRS (u) do<br>      if visited[v] = false then<br>         if $v^{label}$ = NIL and P(u, v) = true then<br>            visited[v] = true<br>            ENQUEUE(Q, v)<br>         end if<br>      end if<br>   end for<br>end while |

The first phase 64 of segmentation 60 extracts smooth surfaces, which are good indicators of large man-made structures such as buildings. Further, regularity in height may be a sufficient signature for making this identification. A significant amount of processing time is thus avoided because there is no need for independent point classification by surface estimation or other local neighborhood methods. First, a 3×3 strip neighborhood is used to compute partial derivatives of strip height $S_i^H$ along the X and Y axes, following which the local height slope $S_i^{HZSLOPE}$ for each strip i is estimated. A strip is labeled as smooth $S^{sm}$=true if the range of slope within the neighborhood is less than a threshold $t_z$=10. For robustness, at least 5 out of 8 neighboring strips may be required to pass this constraint.

A compatibility criterion determines whether or not two strips can belong to the same group. 3D data is inherently less ambiguous than 2D images, allowing the use of simple formulations that are powerful and efficient. For two adjacent strips $s_i$ and $s_j$, the grouping engine uses the following predicate to extract out smooth surfaces:

$$P_{sm}(s_i, s_j) = \begin{cases} \text{true} & \text{iff} \begin{array}{l} (s_i^{sm} \text{ and } s_j^{sm} \text{ and} \\ |s_i^{zmax} - s_j^{zmax}| < 10) \\ \text{OR} \\ ((s_i^{sm} \text{ or } s_j^{sm}) \text{ and} \\ |s_i^{zslope} - s_j^{zslope}| < 10) \end{array} \end{cases} \quad (1)$$

The first condition is valid if two smooth strips have similar height (within for example 10 cm) and the second condition captures strips that belong to smooth but inclined surfaces. These extracted regions will mostly correspond to flat or gabled roofs of buildings. Though split up at every roof indentation, they are very useful as seeds for identifying potential building structures. A post-process filtering operation removes very small smooth regions (less than 20 square meters) and components that have an excessive percentage of tall strips (ground points should not be visible under the roofs). The method for extracting the smooth surfaces is further described in steps 220 to 230 in the flow diagrams of FIGS. 6A and 6B.

The second phase 68 of segmentation is building segmentation, and smooth regions can be important cues for building segmentation. Buildings are very large and have unique geometric signatures that are best exploited in a separate phase. Recognizing building regions early also provides valuable context information for urban scenes. The smooth surfaces extracted in the previous section provide seeds that must be grown and merged with other surfaces to encompass the whole building. A key challenge in urban scenes is to geometrically separate out the roof from trees at a similar height and closely hugging the building facade. On the other hand, roof strips around building edges exhibit many interesting elevation patterns; this causes them to be excluded from the surfaces extracted above and requires merging.

To resolve these two competing goals, information from the smoothness map and information from a ground map are fused to identify definitely non-building areas. The intuition here is that unlike under roofs, the ground points are visible under trees and vegetation. First, an image $G_M$ is calculated of dimensions $N_x \times N_y$, where each pixel in the image $G_M$ contains the minimum height from the ground plane of all points in that strip. Let $S_M$ be another image that stores the height of all smooth strips. A provisional map $B_{PM} = \max(G_M, S_M)$ is produced by doing a pixel-wise or strip-wise max operation to set the height of the strips to $S_{BM}$ in the $B_{PM}$. $B_{PM}$ is then median filtered and dilated for three iterations to produce a building map $B_M$. Finally, all strips or pixels in $B_{PM}$, with height $S^{BM}$ less than 3 meters, are set to 0.

The ground map is a good indicator of true ground, but is less reliable and noisy along building edges and under roofs. This is because of many spurious sensor data points may lie inside the buildings. The max operation compensates for this by replacing pixels in smooth regions with the height of the roof. The dilation on the fused map serves to increase the margin around buildings so that broken edges along the facade may be combined. The net effect of these operations is that the buildings become prominent while the ground map suppresses the effect of adjacent trees preventing segmentation from spiraling out of control.

The predicate function for building segmentation is defined as:

$$P_{bld}(s_i, s_j) = \begin{cases} \text{true} & \text{iff} \quad \begin{array}{c} (s_i^{sm} \text{ and } s_j^{sm} \text{ and} \\ R \leq 1.4) \\ \text{OR} \\ (|s_i^{BM} - s_j^{BM}| < 300 \text{ and} \\ R \leq 1.2). \end{array} \end{cases} \quad (2)$$

The ratio of heights between two strips $$R = \frac{\max(s_i^H, s_j^H)}{\min(s_i^H, s_j^H)}$$

is used to identify discontinuities. The first condition thus allows two smooth strips possibly belonging to different roofs to merge. The second condition connects loose strips at the edges of the facade while using $B_M$ to avoid capturing non-building strips. Adjacent strips with a difference in $B_M$ of 3 meters or more are not allowed to merge. The method for building segmentation is further described in steps 240 to 250 in the flow diagrams of FIGS. 7A and 7B.

The third phase of segmentation 60 is top-down segmentation 70 and is performed by exploiting the nature of height distribution in the real world to determine object connectivity. Unlike some images, color and intensity information included in sensor data, such as LIDAR sensor data, may not be reliable or consistent enough for good 3D segmentation. It is also not desirable to make assumptions on the ordering of point acquisition, which allows data collected with different sensors or different collection times to be combined transparently.

Objects in an urban setting are smooth and height discontinuities often correspond to possible boundaries. Top-down segmentation assumes that all strip points above the ground belong to the same object. This is equivalent to a nadir view of the scene where only objects that are not blanketed by other overhanging structures are visible. These excluded objects usually correspond to small street-side entities like trashcans or fire-hydrants that fall under surrounding foliage. Objects that fall under power-lines may also be "hidden" for the same reason. Nevertheless, over 70% of the objects—especially the larger structures in an urban scene can be retrieved in this scheme. Top-down view of the scene combined with the strip representation allows extremely efficient processing. Where the points are all captured from an aerial sensor, this scheme alone is sufficient for segmentation as the sides of objects are seldom visible without ground data.

The predicate used for top down segmentation is only applied to strips that have not already been classified as belonging to a building. It uses the ratio of heights between adjacent populated strips:

$$P_{td}(s_i, s_j) = \begin{cases} \text{true} & \text{iff} \quad \begin{array}{c} (s_i^{POP} \text{ and } s_j^{POP} \\ \text{AND} \\ R \leq 1.4). \end{array} \end{cases} \quad (3)$$

$$\text{and } R = \frac{\max(s_i^H, s_j^H)}{\min(s_i^H, s_j^H)}$$

The method for top down segmentation is further described in steps 260 to 266 in the flow diagram of FIG. 8.

The fourth phase of segmentation 60 is bottom-up segmentation 74. Ground sensors capture several street-side objects that will not be visible to an aerial sensor due to occlusion or lack of resolution. In contrast to top-down segmentation, bottom-up segmentation identifies highly populated strips projecting up from the ground and then proceeds to group them based on height. Rather than taking the maximum z-value of points in the strip as its height $S^H$, the distribution of points within the strip cells is exploited. The longest array of consecutively populated cells from the ground plane estimate is identified to compute a bottom-up height $S^C$. A vertical Gaussian weighted population in each cell should exceed threshold $t_C = 5$ to be considered populated. Since ground data is more prone to noise and clutter, using a larger vertical neighborhood makes computation of $S^C$ robust.

The predicate function $P_{bup}$ for bottom-up segmentation is similar to $P_{td}$, except that all height computations are based on $S^C$ instead of the top-down strip height. Again, similar to top down segmentation, the predicate for bottom up segmentation is only applied to strips that have not already been classified as belonging to a building.

$$P_{bup}(S_i, S_j) = \text{true iff } (S_i^{POP} \text{ and } S_j^{POP}) \text{ AND } R < 1.4) \quad (4)$$

where $S_i^{POP}$=true if bottom-up-height $S^C$ is not zero i.e. there is something in the strip above the local ground plane.

$S_j^{POP}$=true if bottom-up-height $S^C$ is not zero i.e. there is something in the strip above the local ground plane.

and R=max $(S_i^C, S_j^C)$/min $(S_i^C, S_j^C)$, which is the ratio of bottom-up-heights.

The method for bottom up segmentation is further described in steps 270 to 276 in the flow diagram of FIG. 9.

Finally, since each segment is input to a larger recognition system to filter out implausible objects that do not have enough points. The minimum threshold is set to 35 points above the ground. Very tiny segments adjacent to larger structures are also merged. If not surrounded by ground, these small regions are more likely to be the result of an incorrect grouping. Building segmentation requires that the median height of boundary strips in a region exceed 2 meters. This captures the notion of vertical walls from the ground along the sides of the building, even though points need not be visible on the facade. Some of the bottom-up cues for small isolated objects may be redundant with the top-down segments. Simple area and height overlap constraints are used to identify such cases. Only the top-down segment is retained since it is better at capturing the full extent of the object.

Another key ingredient when processing large 3D sensor point clouds is efficiency. A dataset may contain 950 million points spanning a 3.3 km² area distributed across 380 tiles. Processing close to a billion points has been demonstrated to take less than an hour on a 2.93 GHz processor with 4 GB of RAM. Disk input/output to read the tiles took another 40 minutes. Processing time is dominated by the strip initialization phase that computes the local ground plane estimate. The average initialization time per tile was 8.3 seconds while grouping took only 1.0 second per tile. Since a processing speed at 270,000 points per second is much faster than a typical sensor bandwidth, the algorithms in this disclosure are well suited to real-time sensor applications, such as LIDAR.

The algorithms of this disclosure effectively segment out buildings of varying sizes and shapes and are robust to the clutter of urban environments, where small buildings, trees, powerlines, and other objects of similar height are often huddled together. The global and local constraints are able to correctly delineate boundaries without merging artifacts.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method of recognizing features from sensed data points collected in a 3D environment comprising:

sensing the 3D environment using a sensor that collects a plurality of sensed data points from the 3D environment, each sensed data point having spatial coordinate information in three dimensions x, y and z;

populating a strip histogram grid having a plurality of strips, each strip having a z, a dx dimension and a dy dimension, wherein dx is a portion of an x dimension of the strip histogram grid and dy is a portion of a y dimension of the strip histogram grid, and wherein the z dimension is divided into a plurality of dz portions of the z dimension, so that each strip is divided into a plurality of cells, each cell having a dimension of dx, dy, and dz, by assigning each sensed data point to a strip in the strip histogram grid that has x, y and z dimensions that encompass the spatial coordinate information of the respective assigned sensed data point, and assigning each sensed data point to one of the plurality of dz portions of the z dimension, initializing a ground support variable for each cell of the plurality of cells to zero;

incrementing the ground support variable associated with a respective cell by 1 each time a sensed data point is assigned to that respective cell or a sensed data point is assigned to a cell in a surrounding strip having a same z dimension as the respective cell and being within a set distance of the respective cell; and estimating the local ground plane for the respective strip as being the lowest z level corresponding to a cell within the respective strip with a respective ground support variable greater than a threshold.

2. The method of claim 1 wherein the sensor is a LIDAR.

3. The method of claim 1 wherein the set distance is a radius of 1 meter.

4. The method of claim 1 wherein the set distance comprises cells having the same z dimension as the respective cell within a 3×3 neighborhood of surrounding strips of the respective cell.

5. The method of claim 1 wherein the threshold is 100.

6. The method of claim 1 wherein dx, dy and dz are each equal to 32 cm.

7. The method of claim 1 wherein populating the strip histogram grid comprises:

forming a strip histogram grid having a plurality of strips arranged in a grid, wherein the strip histogram grid has x, y and z extents at least as large as a maximum extent of the spatial coordinate information of the sensed data points in x, y and z dimensions and, wherein each strip in the strip histogram grid has an equal dx dimension in the x dimension and an equal dy dimension in the y dimension.

8. The method of claim 1 further comprising:

estimating a plurality of features for a respective strip in the strip histogram grid by using information on each sensed data point assigned to the respective strip and surrounding strips in the strip histogram grid.

9. The method of claim 8 wherein the plurality of features consists of a strip height $S^H$ being a maximum z dimension $S^{max}$ for an assigned sensed data point in the respective strip, a strip extent being the maximum z dimension $S^{max}$ minus a minimum z dimension $S^{min}$ for an assigned sensed data point in the respective strip, a Boolean flag designating whether the respective strip is populated above the local ground plane for the respective strip $S^{pop}$, a number of assigned sensed data points $S^{pts}$ in the respective strip above the local ground plane for the respective strip, a number of continuously populated cells $S^C$ above the local ground plane for the respective strip, and a local terrain slope $S^{zslope}$ for the respective strip computed by using the local ground plane estimates for strips in a 3×3 strip neighborhood of the respective strip, or any combination thereof.

10. The method of claim 1 further comprising determining a smoothness $S^{sm}$ of a respective strip in the strip histogram grid comprising:
   computing partial derivatives of strip height $S^H$, wherein strip height is a maximum z dimension $S^{max}$ for an assigned sensed data point in a respective strip, along x and y axes for strips in a 3×3 strip neighborhood of the respective strip;
   estimating a local height gradient $S^{zslope}$ for the respective strip from the partial derivatives; and
   labeling the respective strip as smooth $S^{sm}$=true if a range in local height gradient $S^{zslope}$ for the strips within the 3×3 strip neighborhood of the respective strip is less than a threshold $T_z$.

11. The method of claim 10 wherein the threshold $T_Z$ is less than 10.

12. The method of claim 10 wherein only 5 out of 8 of the strips within the 3×3 strip neighborhood of the respective strip have a threshold $T_z$ less than 10.

13. The method of claim 10 further comprising:
   using a predicate $P_{sm}$ to extract out smooth surfaces wherein the predicate comprises satisfying a first condition or a second condition;

$$P_{sm}(s_i, s_j) = \begin{cases} \text{true} & \text{iff} \begin{array}{c} (s_i^{sm} \text{ and } s_j^{sm}) \text{ and} \\ |s_i^{zmax} - s_j^{zmax}| < T_{z1} \\ \text{OR} \\ ((s_i^{sm} \text{ or } s_j^{sm}) \text{ and} \\ |s_i^{zslope} - s_j^{zslope}| <: T_{z2} \end{array} \end{cases}$$

wherein the first condition is true if two neighboring strips are labeled as $S^{sm}$=true and a difference in a height of each of the neighboring strips is less than a first threshold $T_{z1}$; and
   wherein the second condition is true if one of the two neighboring strips are labeled as $S^{sm}$=true and a difference in a local height gradient $S^{zslope}$ of the neighboring strips is less than a second threshold $T_{z2}$.

14. The method of claim 13 wherein the first threshold is 10 cm.

15. The method of claim 13 further comprising:
   calculating an image $G_M$ of dimensions $N_x \times N_y$, wherein the image $G_M$ contains a minimum height $S^{zmin}$ from the local ground plane of all sensed data points in a respective strip;
   forming an image $S_M$ comprising strip height $S^H$ for each respective strip labeled as $S^{sm}$=true; and
   forming a provisional map $B_{PM}$=max($G_M$, $S_M$) by comparing $S^{zmin}$ from $G_M$ and $S^H$ from $S_M$ and setting $S^{BM}$ of each respective strip in the provisional map to the maximum of $S^{zmin}$ and $S^H$.

16. The method of claim 15 further comprising:
   median filtering and dilating $B_{PM}$ for three iterations to produce a building map $B_M$; and
   setting a $S^{BM}$ of a respective strip to zero if the $S^{BM}$ of the respective strip is less than a third threshold.

17. The method of claim 16 wherein the third threshold is 3 meters.

18. The method of claim 15 further comprising:
   using a predicate $P_{bld}$ to perform building segmentation wherein the predicate comprises satisfying a first building segmentation condition or a second building segmentation condition;

$$P_{bld}(s_i, s_j) = \begin{cases} \text{true} & \text{iff} \begin{array}{c} (s_i^{sm} \text{ and } s_j^{sm}) \text{ and} \\ R \leq T_{R1} \\ \text{OR} \\ (|s_i^{BM} - s_j^{BM}| < T_{R2} \text{ and} \\ R \leq T_{R3} \end{array} \end{cases}$$

wherein $R = \frac{\max(s_i^H, s_j^H)}{\min(s_i^H, s_j^H)}$;

wherein the first building segmentation condition is true if two neighboring strips are labeled as $S^{sm}$=true and a ratio of $S^H$ heights between the neighboring strips is less than or equal to a first threshold $T_{R1}$; and
   wherein the second building segmentation condition is true if an absolute difference in $S^{BM}$ is less than a second threshold $T_{R2}$ and the ratio of heights between the neighboring strips is less than or equal to a third threshold $T_{R3}$.

19. The method of claim 18 wherein:
   the first threshold $T_{R3}$ is 1.4;
   the second threshold $T_{R3}$ is 300; and
   the third threshold $T_{R3}$ is 1.2.

20. The method of claim 18 further comprising:
   using a predicate $P_{td}$ to perform top down segmentation wherein the predicate comprises satisfying a first top down segmentation condition, a second top down segmentation condition, and a third top down segmentation condition;

$$P_{td}(s_i, s_j) = \begin{cases} \text{true} & \text{iff} \begin{array}{c} P_{bld}(s_i, s_j) = \text{NOT TRUE} \\ \text{AND} \\ (s_i^{POP} \text{ and } s_j^{POP}) \\ \text{AND} \\ R \leq T_{TD1} \end{array} \end{cases}$$

wherein the first top down condition is true if Pbld $(s_i, s_j)$ is not true;
   wherein the second top down condition is true if each of two neighboring strips have a Boolean flag $S^{pop}$ set to true designating that the respective strip is populated above the local ground plane for the respective strip; and
   wherein the third top down segmentation condition is true if the ratio of heights between the neighboring strips is less than or equal to a threshold $T_{TD1}$.

21. The method of claim 20 wherein:
   the threshold $T_{TD3}$ is 1.4.

22. The method of claim 18 further comprising:
using a predicate $P_{bup}$ to perform bottom up segmentation wherein the predicate comprises satisfying a first bottom up segmentation condition, a second bottom up segmentation condition, and a third bottom up segmentation condition;

$$P_{bup}(S_i, S_j) = true \begin{cases} P_{bld}(s_i, s_j) = \text{NOT TRUE} \\ \text{AND} \\ (s_i^{POP} \text{ and } s_j^{POP}) \\ \text{AND} \\ R < T_{BUP1} \end{cases}$$

wherein R=max $(S_i^C, S_j^C)$/min $(S_i^C, S_j^C)$, wherein each strip is divided into a plurality of cells, each cell having a dimension of dx, dy, and dz and a bottom up height $S^C$ is a number of continuously populated cells from the local ground plane;
wherein the first bottom up condition is true if Pbld $(s_i, s_j)$ is not true;
wherein the second bottom up condition is true if each of two neighboring strips have a Boolean flag $S^{pop}$ set to true designating that the respective strip is populated above the local ground plane for the respective strip;
wherein the third bottom up segmentation condition is true if the ratio of bottom up heights between the neighboring strips is less than a threshold $T_{BUP1}$; and
wherein $S_i^C$ and $S_i^C$ are each equal to or greater than a threshold $T_{BUP2}$.

23. The method of claim 22 wherein:
the threshold $T_{BUP1}$ is 1.4.

24. The method of claim 22 wherein:
$T_{BUP2}$ is 35.

25. A method of recognizing features from sensed data points collected in a 3D environment comprising:
sensing the 3D environment using a sensor that collects a plurality of sensed data points from the 3D environment, each sensed data point having spatial coordinate information in three dimensions x, y and z;
populating a strip histogram grid having a plurality of strips, each strip having a z, a dx dimension and a dy dimension, wherein dx is a portion of an x dimension of the strip histogram grid and dy is a portion of a y dimension of the strip histogram grid, and wherein the z dimension is divided into a plurality of dz portions of the z dimension, so that each strip is divided into a plurality of cells, each cell having a dimension of dx, dy, and dz, by assigning each sensed data point to a strip in the strip histogram grid that has x, y and z dimensions that encompass the spatial coordinate information of the respective assigned sensed data point, and assigning each sensed data point to one of the plurality of dz portions of the z dimension;
estimating the local ground plane for a respective strip as being a z dimension corresponding to a respective cell within the respective strip by using a first number of sensed data points assigned to the respective cell and a second number of sensed data points assigned to cells having the same z dimension in strips surrounding the respective strip in the strip histogram grid and being within a set distance of the respective strip;
wherein the local ground plane for a respective strip corresponds to the z dimension of the lowest cell in the respective strip for which the sum of the first number and the second number exceeds a threshold value.

26. The method of claim 25 further comprising estimating a plurality of features for a respective strip in the strip histogram grid, the plurality of features comprising a strip height $S^H$ being a maximum z dimension $S^{max}$ for an assigned sensed data point in the respective strip, a strip extent being the maximum z dimension $S^{max}$ minus a minimum z dimension $S^{min}$ for an assigned sensed data point in the respective strip, a Boolean flag designating whether the respective strip is populated above the local ground plane for the respective strip $S^{pop}$, a number of assigned sensed data points $S^{pts}$ in the respective strip above the local ground plane for the respective strip, a number of continuously populated cells $S^C$ above the local ground plane for the respective strip, and a local terrain slope $S^{zslope}$ for the respective strip computed by using the local ground plane estimates for strips in a 3×3 strip neighborhood of the respective strip, or any combination thereof.

27. The method of claim 25 further comprising determining a smoothness $S^{sm}$ of a respective strip in the strip histogram grid comprising:
computing partial derivatives of strip height $S^H$, wherein strip height is a maximum z dimension $S^{max}$ for an assigned sensed data point in a respective strip, along x and y axes for strips in a 3×3 strip neighborhood of the respective strip;
estimating a local height gradient $S^{zslope}$ for the respective strip from the partial derivatives;
labeling the respective strip as smooth $S^{sm}$=true if a range in local height gradient $S^{zslope}$ for the strips within the 3×3 strip neighborhood of the respective strip is less than a threshold $T_z$; and
using a predicate $P_{sm}$ to extract out smooth surfaces wherein the predicate comprises satisfying a first condition or a second condition;

$$P_{sm}(s_i, s_j) = \begin{cases} true & iff \end{cases} \begin{cases} (s_i^{sm} \text{ and } s_j^{sm} \text{ and} \\ |s_i^{zmax} - s_j^{zmax}| < T_{z1} \\ \text{OR} \\ ((s_i^{sm} \text{ or } s_j^{sm}) \text{ and} \\ |s_i^{zslope} - s_j^{zslope}| <: T_{z2} \end{cases}$$

wherein the first condition is true if two neighboring strips are labeled as $S^{sm}$=true and a difference in a height of each of the neighboring strips is less than a first threshold $T_{z1}$; and
wherein the second condition is true if one of the two neighboring strips are labeled as $S^{sm}$=true and a difference in a local height gradient $S^{zslope}$ of the neighboring strips is less than a second threshold $T_{z2}$.

28. The method of claim 27 further comprising a method of performing building segmentation comprising:
calculating an image $G_M$ of dimensions $N_x \times N_y$, wherein the image $G_M$ contains a minimum height $S^{zmin}$ from the local ground plane of all sensed data points in a respective strip;
forming an image $S_M$ comprising strip height $S^H$ for each respective strip labeled as $S^{sm}$=true;
forming a provisional map $B_{PM}$=max$(G_M, S_M)$ by comparing $S^{zmin}$ from $G_M$ and $S^H$ from $S_M$ and setting $S^{BM}$ of each respective strip in the provisional map to the maximum of $S^{zmin}$ and $S^H$;

median filtering and dilating $B_{PM}$ for three iterations to produce a building map $B_M$;

setting a $S^{BM}$ of a respective strip to zero if the $S^{BM}$ of the respective strip is less than a third threshold; and using a predicate $P_{bld}$ to perform building segmentation wherein the predicate comprises satisfying a first building segmentation condition or a second building segmentation condition;

$$P_{bld}(s_i, s_j) = \begin{cases} \text{true} & \text{iff} \begin{array}{c} (s_i^{sm} \text{ and } s_j^{sm} \text{ and} \\ R \leq T_{R1} \\ \text{OR} \\ (|s_i^{BM} - s_j^{BM}| < T_{R2} \text{ and} \\ R \leq T_{R3} \end{array} \end{cases}$$

wherein $R = \frac{\max(s_i^H, s_j^H)}{\min(s_i^H, s_j^H)}$;

wherein the first building segmentation condition is true if two neighboring strips are labeled as $S^{sm}$=true and a ratio of $S^H$ heights between the neighboring strips is less than or equal to a first threshold $T_{R1}$; and wherein the second building segmentation condition is true if an absolute difference in $S^{BM}$ is less than a second threshold $T_{R2}$ and the ratio of heights between the neighboring strips is less than or equal to a third threshold $T_{R3}$.

29. The method of claim 28 further comprising:

using a predicate $P_{td}$ to perform top down segmentation wherein the predicate comprises satisfying a first top down segmentation condition, a second top down segmentation condition, and a third top down segmentation condition;

$$P_{td}(s_i, s_j) = \begin{cases} \text{true} & \text{iff} \begin{array}{c} P_{bld}(s_i, s_j) = \text{NOT TRUE} \\ \text{AND} \\ (s_i^{POP} \text{ and } s_j^{POP}) \\ \text{AND} \\ R \leq T_{TD1} \end{array} \end{cases}$$

wherein the first top down condition is true if Pbld ($s_i$, $s_j$) is not true;

wherein the second top down condition is true if each of two neighboring strips have a Boolean flag $S^{pop}$ set to true designating that the respective strip is populated above the local ground plane for the respective strip; and wherein the third top down segmentation condition is true if the ratio of heights between the neighboring strips is less than or equal to a threshold $T_{TD1}$.

30. The method of claim 28 further comprising:

using a predicate $P_{bup}$ to perform bottom up segmentation wherein the predicate comprises satisfying a first top down segmentation condition, a second top down segmentation condition, and a third top down segmentation condition;

$$P_{bup}(S_i, S_j) = \text{true} \begin{cases} P_{bld}(s_i, s_j) = \text{NOT TRUE} \\ \text{AND} \\ (s_i^{POP} \text{ and } s_j^{POP}) \\ \text{AND} \\ R < T_{BUP1} \end{cases}$$

wherein R=max $(S_i^C, S_j^C)$/min $(S_i^C, S_j^C)$, wherein each strip is divided into a plurality of cells, each cell having a dimension of dx, dy, and dz and a bottom up height $S^C$ is a number of continuously populated cells from the local ground plane;

wherein the first bottom up condition is true if Pbld ($s_i$, $s_j$) is not true;

wherein the second bottom up condition is true if each of two neighboring strips have a Boolean flag $S^{pop}$ set to true designating that the respective strip is populated above the local ground plane for the respective strip;

wherein the third bottom up segmentation condition is true if the ratio of bottom up heights between the neighboring strips is less than a threshold $T_{BUP1}$; and wherein $S_i^C$ and $S_j^C$ are each equal to or greater than a threshold $T_{BUP2}$.

31. A method of recognizing features from sensed data points collected in a 3D environment comprising:

sensing the 3D environment using a sensor that collects a plurality of sensed data points from the 3D environment, each sensed data point having spatial coordinate information in three dimensions x, y and z;

populating a strip histogram grid having a plurality of strips, each strip having a z, a dx dimension and a dy dimension, wherein dx is a portion of an x dimension of the strip histogram grid and dy is a portion of a y dimension of the strip histogram grid, and wherein the z dimension is divided into a plurality of dz portions of the z dimension, so that each strip is divided into a plurality of cells, each cell having a dimension of dx, dy, and dz, by assigning each sensed data point to a strip in the strip histogram grid that has x, y and z dimensions that encompass the spatial coordinate information of the respective assigned sensed data point, and assigning each sensed data point to one of the plurality of dz portions of the z dimension;

incrementing a ground support variable associated with a respective cell by 1 each time a sensed data point is assigned to that respective cell or a sensed data point is assigned to a cell in a surrounding strip having a same z dimension as the respective cell and being within a set distance of the respective cell; and estimating the local ground plane for the respective strip as being the lowest z level corresponding to a cell within the respective strip with a respective ground support variable greater than a threshold;

estimating a plurality of features for each respective strip in the strip histogram grid; and performing segmentation of the strip histogram grid using the local ground plane estimate for each respective strip and the plurality of features for the strips in the strip histogram grid.

* * * * *